(12) United States Patent
Ono

(10) Patent No.: US 10,591,357 B2
(45) Date of Patent: Mar. 17, 2020

(54) COLORIMETRIC VALUE DETECTION SYSTEM AND COLORIMETRIC VALUE DETECTION METHOD

(71) Applicant: KONICA MINOLTA, INC., Tokyo (JP)

(72) Inventor: Koichi Ono, Kasukabe (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/191,598

(22) Filed: Nov. 15, 2018

(65) Prior Publication Data
US 2019/0170581 A1 Jun. 6, 2019

(30) Foreign Application Priority Data

Dec. 4, 2017 (JP) .................................. 2017-232297

(51) Int. Cl.
*G01J 3/46* (2006.01)
*B41F 33/00* (2006.01)
*G06K 15/02* (2006.01)
*H04N 1/60* (2006.01)

(52) U.S. Cl.
CPC .......... *G01J 3/462* (2013.01); *B41F 33/0036* (2013.01); *G01J 3/463* (2013.01); *G06K 15/027* (2013.01); *G06K 15/1807* (2013.01); *H04N 1/60* (2013.01); *G01J 2003/466* (2013.01); *G01J 2003/467* (2013.01)

(58) Field of Classification Search
CPC .......... G01J 3/462; G01J 3/463; G01J 3/1807; G01J 2003/466; G01J 2003/467; G01J 3/0289; G01J 3/50; G01J 3/524; H04N 1/60; H04N 1/00; H04N 1/603; G06K 15/027; G06K 15/1807; B41F 33/0036
See application file for complete search history.

(56) References Cited

U.S. PATENT DOCUMENTS

2016/0248942 A1* 8/2016 Horita .................. H04N 1/6019

FOREIGN PATENT DOCUMENTS

JP 2016-070697 A 5/2016

* cited by examiner

*Primary Examiner* — Abdullahi Nur
(74) *Attorney, Agent, or Firm* — Buchanan, Ingersoll & Rooney PC

(57) ABSTRACT

A colorimetric value detection system detects a colorimetric value at a colorimetric position of a printed material using a colorimeter, and the colorimetric value detection system includes: a hardware processor that: calculates an output color of an object at the colorimetric position on the basis of target profile information of a printing device and object information of the printed material; and compares the colorimetric value of the colorimeter with the output color calculated by the hardware processor, wherein the colorimetric value of an object or at a position desired by a user is specified from a degree of coincidence of phase profiles of the colorimetric value.

7 Claims, 15 Drawing Sheets ered with reference to the drawings. Note that in the following description and drawings, the same symbols are attached to the same components and functions and the repetitive description thereof will be omitted.

COLORIMETRIC VALUE DETECTION SYSTEM AND COLORIMETRIC VALUE DETECTION METHOD

The entire disclosure of Japanese patent Application No. 2017-232297, filed on Dec. 4, 2017, is incorporated herein by reference in its entirety.

BACKGROUND

Technological Field

The present invention relates to a colorimetric value detection system and a colorimetric value detection method.

Description of the Related Art

From a viewpoint of favorably maintaining the print quality, there are cases where spot colorimetry is performed for a specific position of an output printed material, using a manual colorimeter, to check the color of the printed material. In the spot colorimetry, there are cases where the color of several points of positions in the printed material is measured to check whether the color is not changed by measuring the color of the same position for every thousands of printed materials or to check color unevenness in a surface of the printed material.

However, in a case of the spot colorimetry using a manual colorimeter, a neighboring color of a position slightly shifted from an object to be measured may be measured and detected if the object to be measured is small because the colorimetry is manually performed. On the contrary, if the object to be measured is large, which of a plurality of colorimetric colors in a vicinity of the object should be measured is not known and the color at a different position may be measured every time.

As described above, in a case of the spot colorimetry using a manual colorimeter, there is a problem that the colorimetric position differs depending on an operator. To solve this problem, a technique of displaying a position to be measured on an operation screen of a personal computer and presenting the position to the user is conceivable. However, since the colorimeter can detect only the measured color, whether the measured position is actually a correct position is left to the operation of the user.

In view of the foregoing, as a technology of presenting the position to be measured, a technology of generating a measurement position presentation guide indicating a measurement position of a printed material on the basis of print image data, and arranging the measurement position presentation guide on the printed material to present the measurement position has been proposed (for example, see JP 2016-70697 A).

According to the conventional technology disclosed in JP 2016-70697A, a colorimetric position on the printed material can be presented to a user. However, even if the colorimetric position can be presented to the user, it is not always the case that the user correctly detects the color of the colorimetric position and can accurately acquire a colorimetric value.

SUMMARY

An object of the present invention is to provide a colorimetric value detection system and a colorimetric value detection method for correctly detecting a colorimetric color at a colorimetric position on a printed material.

To achieve the abovementioned object, according to an aspect of the present invention, there is provided a colorimetric value detection system that detects a colorimetric value at a colorimetric position of a printed material using a colorimeter, and the colorimetric value detection system reflecting one aspect of the present invention comprises: a hardware processor that: calculates an output color of an object at the colorimetric position on the basis of target profile information of a printing device and object information of the printed material; and compares the colorimetric value of the colorimeter with the output color calculated by the hardware processor, wherein the colorimetric value of an object or at a position desired by a user is specified from a degree of coincidence of phase profiles of the colorimetric value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7A illustrates a display example of thumbnails and FIG. 7B illustrates a display example of a specified colorimetric position P;

DETAILED DESCRIPTION OF EMBODIMENTS

Figure 1:
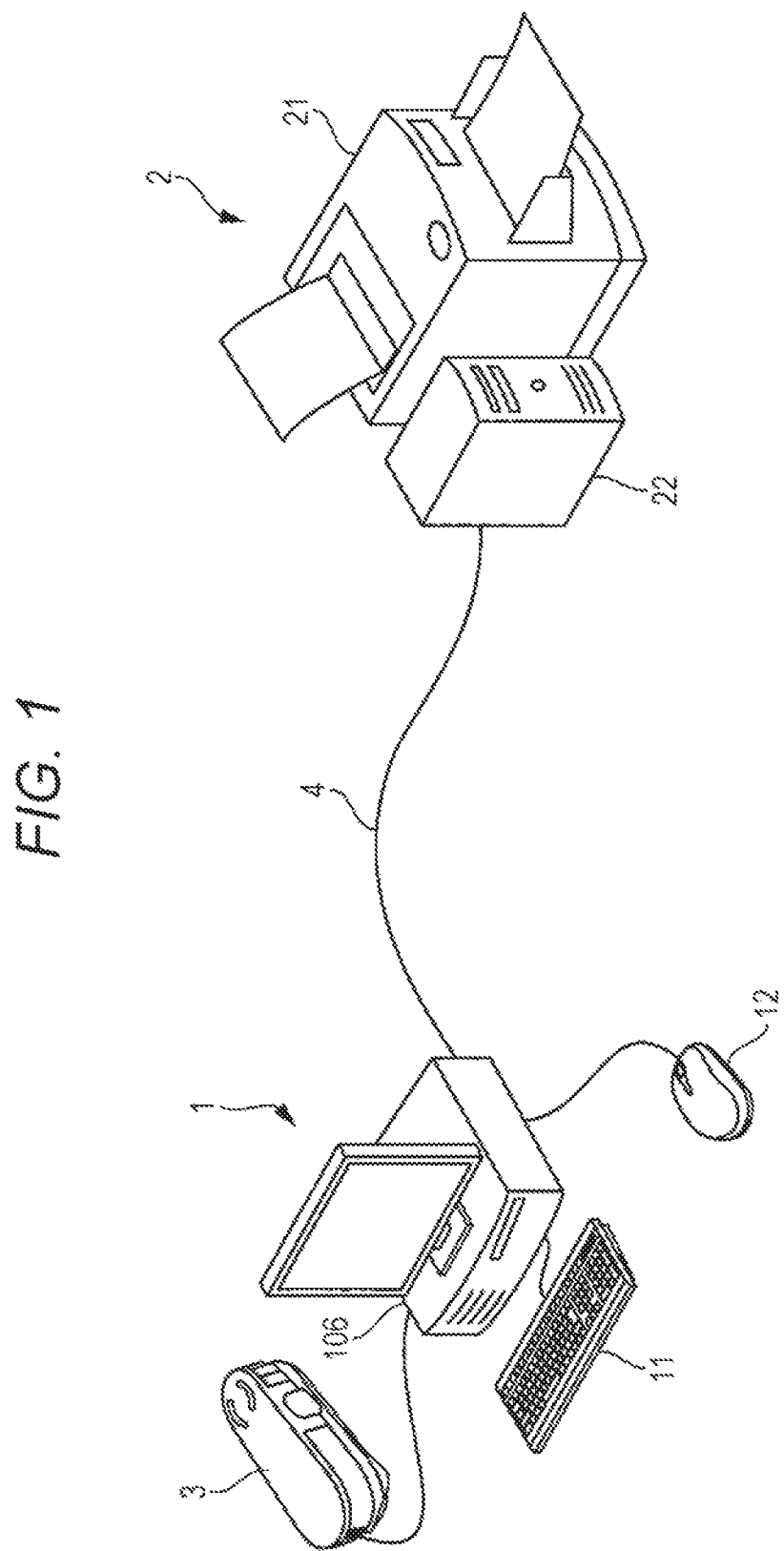
FIG. 1 is a system configuration diagram schematically illustrating a system configuration of a printing system to which an embodiment of the present invention is applied.

Hereinafter, a mode for carrying out the present invention (hereinafter referred to as "embodiment") will be described in detail with reference to the drawings. However, the present invention is not limited to the embodiment. Note that, in the following description and drawings, the same reference numerals are used for the same elements or elements having the same function, and redundant description is omitted.

Printing System

FIG. 1 is a system configuration diagram schematically illustrating a system configuration of a printing system to which an embodiment of the present invention is applied. As illustrated in FIG. 1, the present printing system includes a personal computer 1, a printing device 2, and a manual colorimeter 3. A keyboard 11 and a mouse 12 are connected to the personal computer 1.

The personal computer 1 has functions of a colorimetric position presentation system and a colorimetric value detection system that will be described below. In other words, the colorimetric position presentation system and the colorimetric value detection system are configured by software in the personal computer 1, and a color management application for realizing the functions of the colorimetric position presentation system and the colorimetric value detection system is incorporated in the personal computer 1.

The printing device 2 is configured by a print engine 21 and a printer controller 22. The personal computer 1 and the printer controller 22 are connected via a communication line 4. As the communication line 4, a dedicated line, the Internet, a local area network (LAN), or the like can be exemplified.

Figure 2:
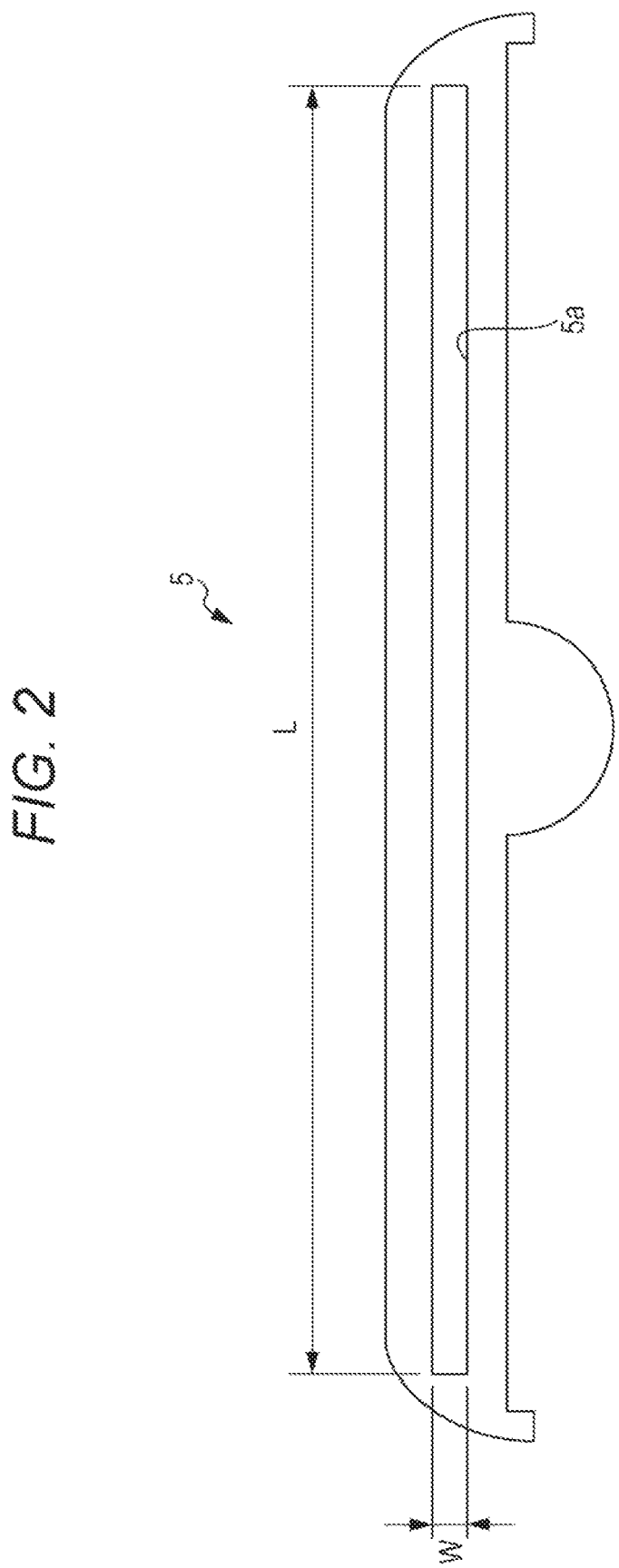
FIG. 2 is a plan view illustrating an example of a guide rail of a manual colorimeter.

The manual colorimeter 3 is connected to the personal computer 1. The manual colorimeter 3 performs colorimetry of a predetermined position on a printed material (for example, a sheet of paper) output by the printing device 2 to check the color from a viewpoint of favorably maintaining the print quality. The colorimetry by the manual colorimeter 3 is generally performed using a guide rail 5 as illustrated in FIG. 2, for example.

The guide rail 5 has a guide groove 5a having a length L and a width W formed along a longitudinal direction of the guide rail 5, and is set on the printed material by a user such that a colorimetric position on the printed material or an object including the colorimetric position is located within the guide groove 5a. Then, the manual colorimeter 3 moves along the guide groove 5a of the guide rail 5 to measure the color of (perform colorimetry of) the colorimetric position on the printed material or the object including the colorimetric position, under the user's operation.

Continuously measuring the color of the printed material while moving the manual colorimeter 3 in this way is scan colorimetry (scan measurement). In contrast, measuring the color in a minute region while making the manual colorimeter 3 to stand still is spot colorimetry (spot measurement).

Colorimetric Position Presentation System

Next, the colorimetric position presentation system configured by the personal computer 1 in the printing system will be described.

Figure 3:
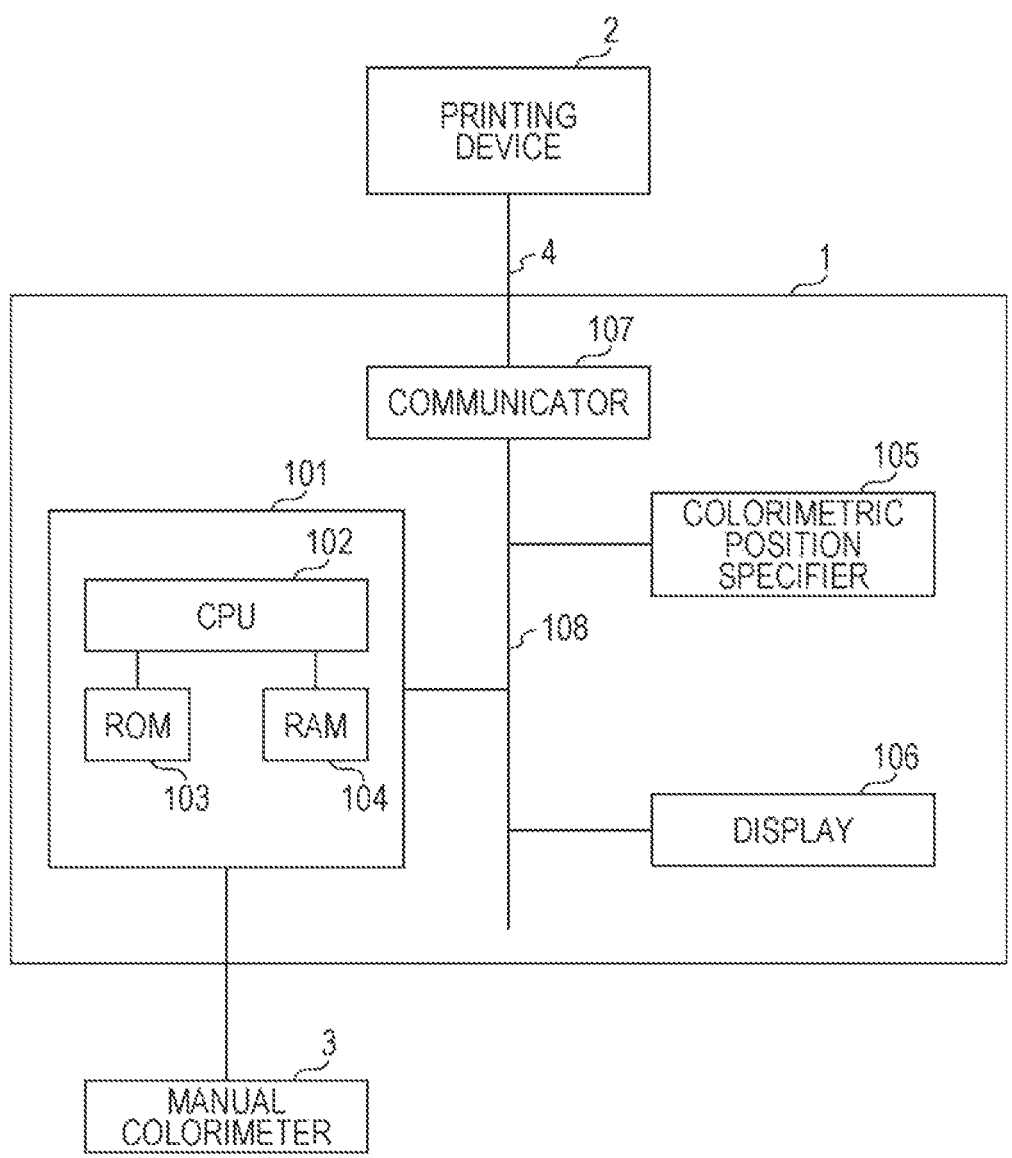
FIG. 3 is a block diagram illustrating an outline of a configuration of a colorimetric position presentation system according to an embodiment of the present invention.

FIG. 3 is a block diagram illustrating an outline of a configuration of the colorimetric position presentation system according to an embodiment of the present invention. The colorimetric position presentation system according to the present embodiment is configured by the personal computer 1.

The personal computer 1 includes a controller 101 that performs control for realizing the functions of the colorimetric position presentation system according to the present embodiment. The controller 101 includes a central processing unit (CPU) 102, a read only memory (ROM) 103 for storing a program executed by the CPU 102 and the like, and a random access memory (RAM) 104 used as a work area of the CPU 102. The color management application for realizing the functions of the colorimetric position presentation system is stored in the RAM 104.

The controller 101 is connected to a colorimetric position specifier 105, a display 106, and a communicator 107 via a system bus 108. The colorimetric position specifier 105 includes the keyboard 11, the mouse 12, and the like connected to the personal computer 1, and specifies the colorimetric position on the printed material under the user's operation. In other words, when performing colorimetry of the printed material output by the printing device 2, the user specifies the colorimetric position on the printed material on the display 106 of the personal computer 1 using the keyboard 11, the mouse 12, or the like.

When the colorimetric position is specified by the user, the controller 101 extracts candidates for objects serving as markers for performing the colorimetry of the colorimetric position specified by the colorimetric position specifier 105. That is, the controller 101 has a function as an object extractor for extracting the candidates for objects serving as markers for performing the colorimetry of the colorimetric position.

The display 106 includes a liquid crystal display (LCD), an organic electro luminescence (EL) display, or the like. The display 106 presents the objects serving as markers to the user by displaying the objects on the screen when there are the candidates for the objects serving as markers on the basis of an extraction result by the function of the object extractor provided in the controller 101 under the control of the controller 101.

Figure 4:
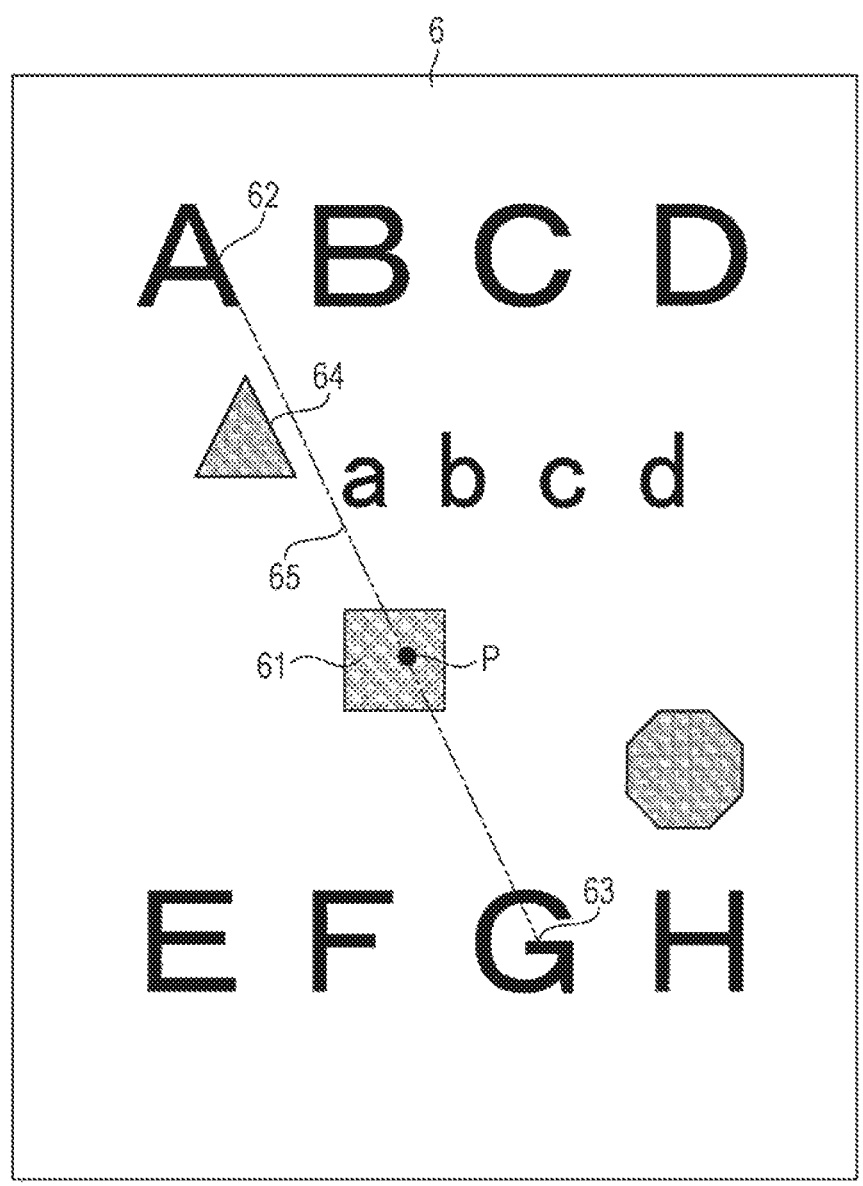
FIG. 4 is a diagram illustrating an example of a color image of a printed material.

FIG. 4 illustrates an example of a color image of a printed material 6. To facilitate the understanding, FIG. 4 illustrates a schematic color image. However, content of the color image is arbitrary. Here, consider a case in which the user specifies a desired position in a rectangular object 61 in the color image of the printed material 6 as the colorimetric position P. When the colorimetric position P is specified, processing of extracting the candidates for objects serving as markers for performing the colorimetry of the colorimetric position P is performed.

The candidates for objects serving as markers are extracted under the following conditions (1) to (3), as an example.

(1) An object adjustable to the length of the guide groove 5a of the guide rail 5 with the colorimetric position P as a base point (2) A letter, an edge portion of an image object such as an edge portion 62 of a letter A or an edge portion 63 of a letter G (3) A portion of an image object in which one side of the image object goes along the guide groove 5a of the guide rail 5, for example, an oblique side 64 of a triangular object Then, when the candidates for objects are extracted under the conditions (1) to (3), objects at distances reachable by the guide rail 5 of the manual colorimeter 3 from the colorimetric position P are extracted as the candidates for objects serving as markers.

As the objects serving as markers, when the colorimetric position P specified by the user is included on a straight line connecting candidates, the candidates are extracted from among the candidates extracted as described above, as the objects serving as markers. As an example, in a case where the edge portion 62 of a letter A and the edge portion 63 of a letter G are included in the extracted candidates, the colorimetric position P is included on a straight line 65 connecting the edge portion 62 and the edge portion 63, and therefore the edge portion 62 of a letter A and the edge portion 63 of a letter G are extracted as the objects serving as markers.

In a case where a plurality of objects serving as markers is extracted by the processing, the present system (controller 101) can automatically determine the objects serving as markers or the objects serving as markers can be determined under selection by the user.

In a case where the present system automatically determines the objects serving as markers, the determination can be made according to the order of priority. Examples of the order of priority include, in a case of scan colorimetry, objects in a vicinity of the colorimetric position having a color different detectable as an edge, the colorimetric position existing between objects serving as markers, and distances of objects serving as markers from the colorimetric position being favorably closest.

In a case where there are no objects serving as markers, when an object to be measured is included on straight lines each connecting two of the extracted candidates for objects serving as markers, candidates favorably closest to the position of an object in which the colorimetric position is specified, in the candidates, are presented to the user as alternative markers.

Further, in a case where one of objects serving as markers is made inputtable by the user and the user specifies an object serving as a marker, a remaining object serving as a marker is extracted from a straight line connecting the specified marker and the colorimetric position.

As described above, the colorimetric position presentation system according to the present embodiment extracts the candidates for objects serving as markers for performing the colorimetry of the specified colorimetric position P when the colorimetric position P on the printed material 6 is specified by the user. At that time, objects having characteristics specifiable by the user at the time of the colorimetry are extracted as the candidates for objects serving as markers, and the extracted objects are presented to the user.

Since the presented objects are the candidates for objects serving as markers for performing the colorimetry of the colorimetric position P, the colorimetric position P can be presented to the user, accordingly. The user, who has been presented the objects serving as markers, performs scan colorimetry by moving the manual colorimeter 3 along the guide groove 5a of the guide rail 5 using the guide rail 5 on the basis of the objects serving as markers, thereby to perform the colorimetry of the specified colorimetric position P.

Figure 5:
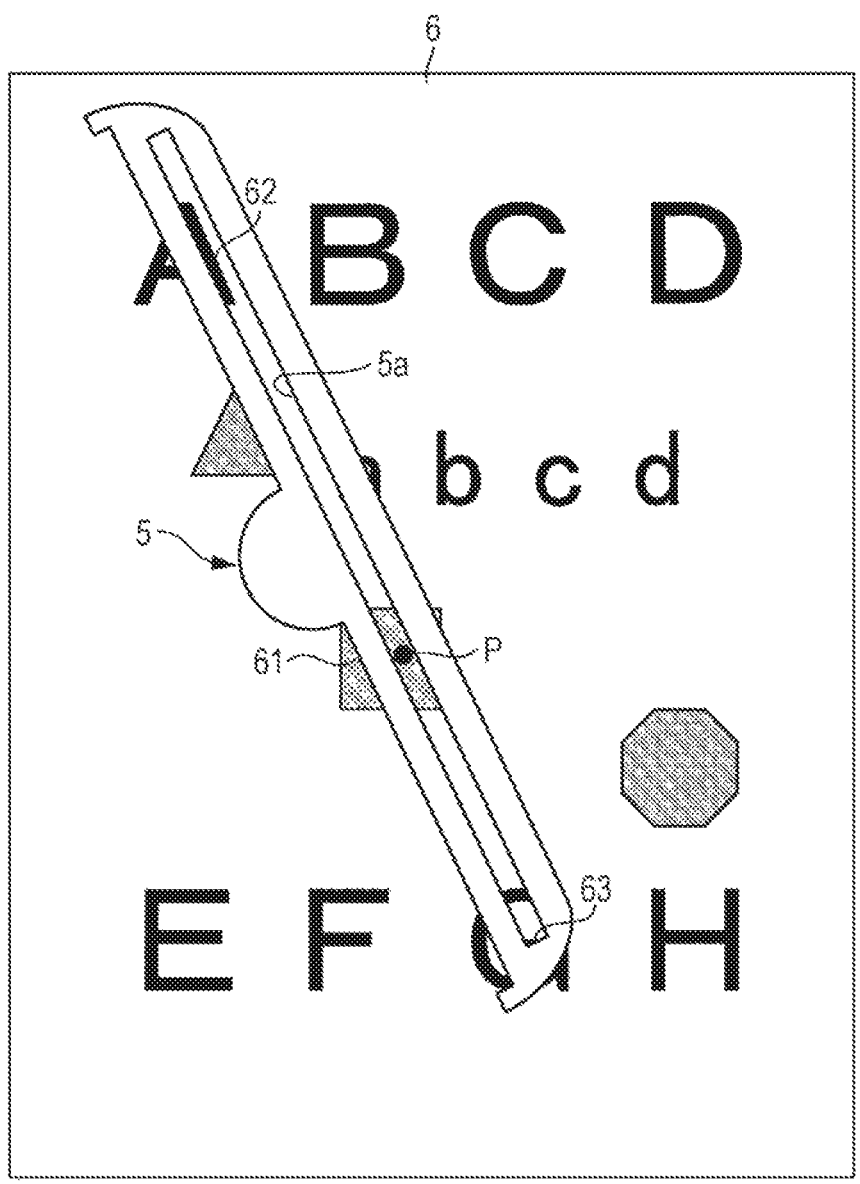
FIG. 5 is an explanatory diagram of a case where colorimetry of a specified colorimetric position is performed using the guide rail by the manual colorimeter.

Here, the colorimetry in a case where the two points of the edge portion 62 of a letter A and the edge portion 63 of a letter G are extracted on the printed material 6 illustrated in FIG. 4 as the candidates for objects serving as markers will be described. In this case, as illustrated in FIG. 5, the guide rail 5 is set such that the edge portion 62 of a letter A and the edge portion 63 of a letter G are located within the guide groove 5a of the guide rail 5 with the edge portion 63 of a letter G as a starting point of the guide rail 5. At this time, as will be understood, the specified colorimetric position P is also located within the guide groove 5a. In this state, the manual colorimeter 3 is moved along the guide groove 5a of the guide rail 5, so that the scan colorimetry can be performed.

As described above, according to the colorimetric position presentation system of the embodiment of the present invention, the colorimetric position on the printed material can be easily and reliably presented to the user even if a measurement position presentation guide is not arranged on the printed material as in a case of the conventional technology described in JP 2016-70697 A. Then, the user can perform the colorimetry of the colorimetric position P on the printed material 6 on the basis of the presented candidates for objects serving as markers.

Colorimetric Position Presentation Method

Figure 6:
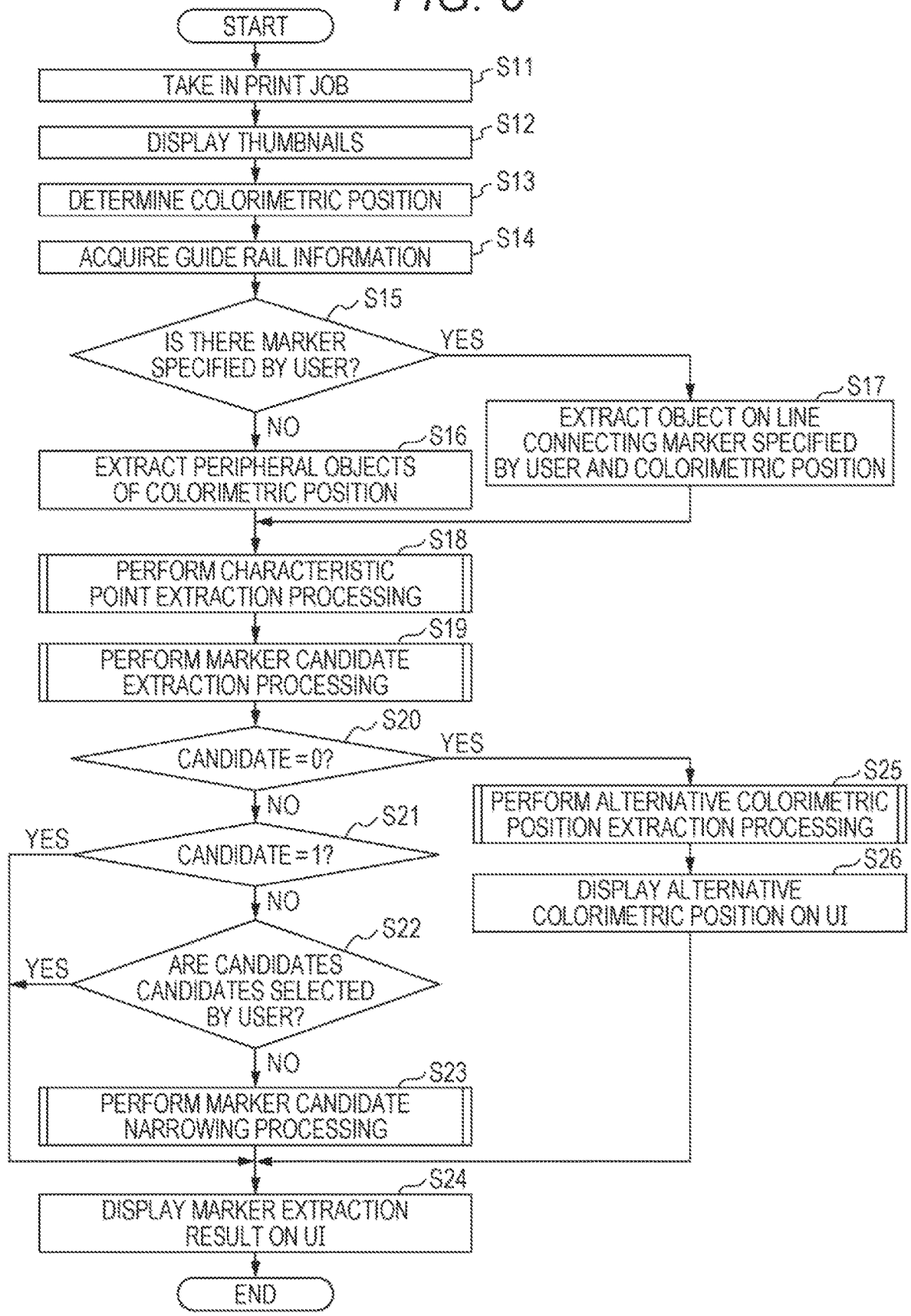
FIG. 6 is a flowchart illustrating an example of a flow of processing of a colorimetric position presentation method executed in a colorimetric position presentation system according to an embodiment of the present invention.

Next, a colorimetric position presentation method executed in the colorimetric position presentation system having the above configuration will be described with reference to the flowchart in FIG. 6. A series of processing for presenting the colorimetric position is executed under the control of the controller 101. This point similarly applies to various types of processing to be described below.

Figure 7A:
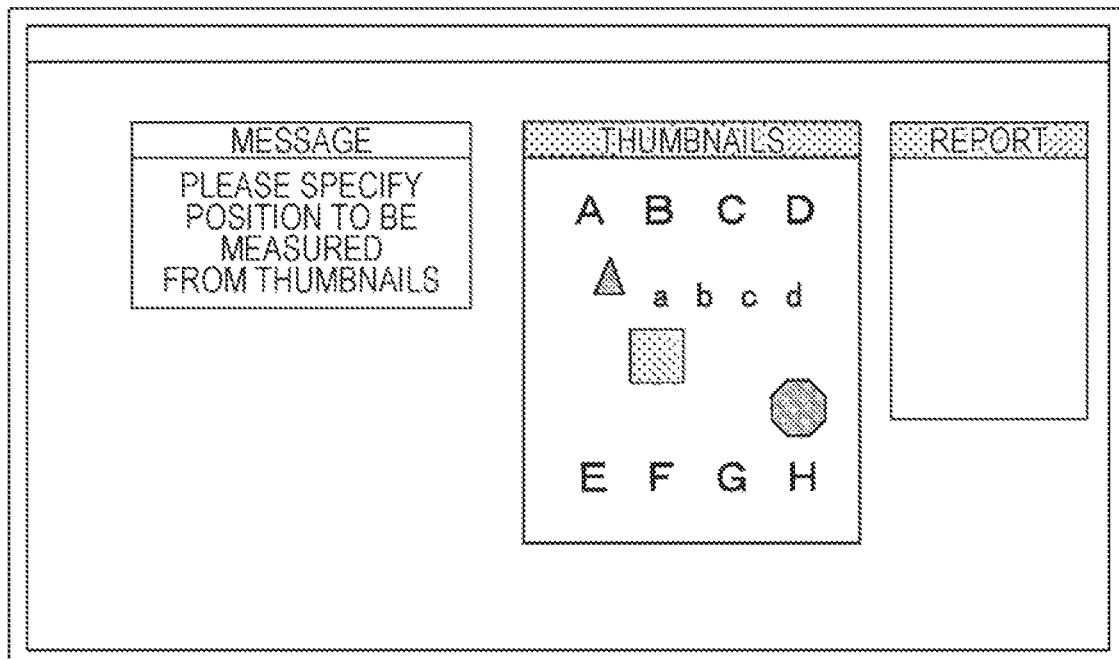
FIGS. 7A and 7B are diagrams illustrating an example of a display screen for specifying a portion for which the color is to be verified.

The controller 101 takes in print data for which the color is to be verified into the color management application (step S11), and creates thumbnails on the basis of the taken print data and displays a screen for specifying a portion for which the color is to be verified on the display 106 of the personal computer 1 (step S12). FIG. 7A illustrates an example of the display screen for specifying the portion for which the color is to be verified. At this time, a message "Please specify a position to be measured from the thumbnails" is displayed on the display screen, for example.

Figure 7B:
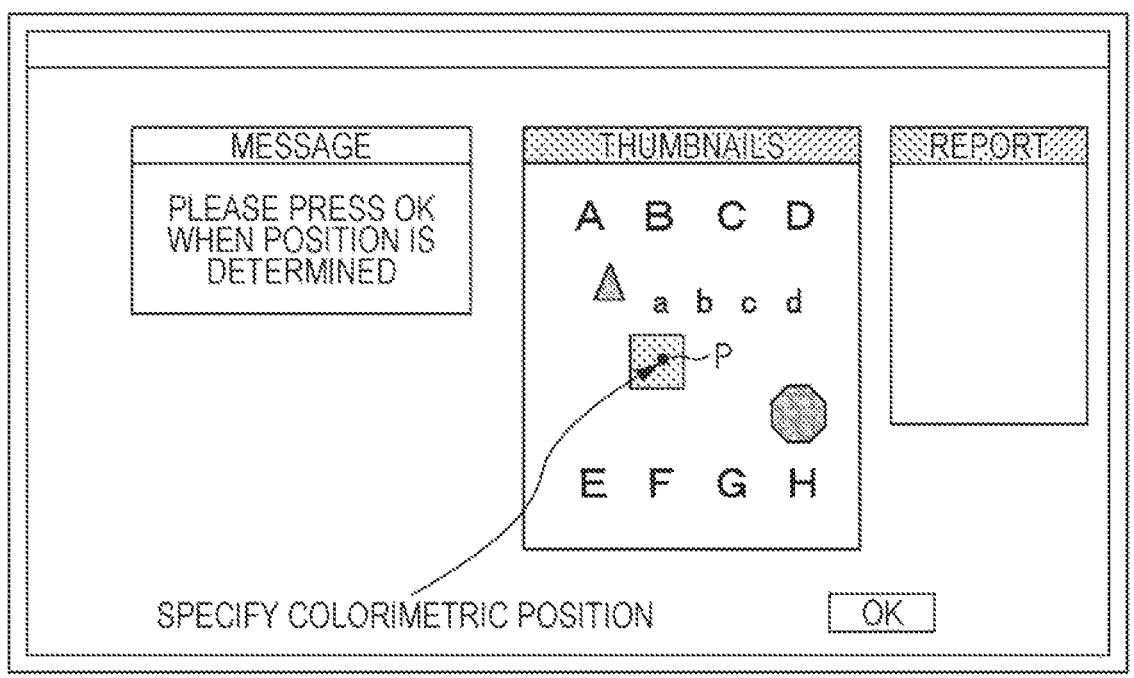

The user specifies the colorimetric position P from a thumbnail image on the screen displayed on the display 106, using the mouse 12, for example. At this time, the specified colorimetric position P is displayed and a message "Please press OK when the position is determined" is displayed on the thumbnail image on the display screen, as illustrated in FIG. 7B. Then, when the user specifies the colorimetric position P and clicks "OK", the controller 101 determines the colorimetric position P in response to the click (step S13).

Next, the controller 101 acquires information of the guide rail 5, specifically, information of the length L and the width W of the guide groove 5a (step S14). The information of the guide rail 5 may be acquired by a method of inputting data using a user interface (UI) by the user or by a method of holding data for each manual colorimeter 3 in the present system. In the present example, description will be given on the assumption that the present system holds the data.

Next, the controller 101 determines whether the object serving as a marker has been specified by the user (step S15). In a case where no object has been specified (No in step S15), the controller 101 extracts objects in the periphery of the colorimetric position P (step S16). Here, the periphery of the colorimetric position P refers to a range of the distance reachable by the guide rail 5 of the manual colorimeter 3 from the colorimetric position P. In a case where the object has been specified by the user (Yes in step S15), the controller 101 extracts an object located on the straight line connecting the marker specified by the user and the colorimetric position P (step S17).

Next, the controller 101 executes processing of extracting characteristic points having a characteristic recognizable by the user as the starting points of the guide rail 5 from among the peripheral objects extracted in the processing in step S16 or S17 (step S18). The method of extracting the characteristic points is as described in (1) to (3) below.
(1) An object smaller than the width W of the guide groove 5a of the guide rail 5
(2) An edge portion of letter/image object
(3) A portion of an image object in which one side goes along the guide groove 5a of the guide rail 5 in image objects Details of the characteristic point extraction processing will be described below.

Next, the controller 101 executes processing of extracting candidates that can include the colorimetric position P on a straight line connecting the characteristic points, from the characteristic points extracted in the processing of step S18 (step S19). Details of the marker candidate extraction processing will be described below.

Next, the controller 101 determines whether the number of the candidates extracted in step S19 is 0 (step S20). In a case where the candidate=0 is not satisfied (No in step S20), the controller 101 determines whether the number of the extracted candidates is 1 (step S21). Then, in a case where the candidate=1 is not satisfied (No in step S21), the controller 101 determines whether the candidates have been selected by the user (step S22). That is, in a case where there is a plurality of candidates, the user is prompted to select a candidate. Regarding candidate selection by the user, the candidates may be registered in advance in the present system or the user may specify the candidate using the user interface each time.

In a case where the candidates are not the candidates selected by the user (No in step S22), the controller 101 executes marker candidate narrowing processing (step S23). In the marker candidate narrowing processing, the number of candidates is narrowed down to 1 under the following conditions (1) to (3).
(1) An object in the vicinity of the colorimetric position has a color difference detectable as an edge when the straight line connecting the extracted points is scanned and measured
(2) The colorimetric position lies between the characteristic points
(3) The distance between the two point characteristic points is short In a case where there is no candidate, combinations of the characteristic points with which the object to be measured is measurable in lines connecting two of the characteristic points are extracted, a combination closest to the position specified as the colorimetric position P is extracted, and a screen asking for change of the colorimetric position is displayed to the user and prompts the user to make a selection. Details of the marker candidate narrowing processing will be described below.

Next, the controller 101 displays an extraction result of the markers, that is, the extracted combination of the characteristic points on the thumbnail image to notify the user to perform the scan colorimetry while setting the guide groove 5a of the guide rail 5 along the characteristic points (step S24). Here, the user is notified to perform the scan colorimetry. However, the spot colorimetry can be performed instead of the scan colorimetry.

In a case where the candidate=1 is satisfied (Yes in step S21) or in a case where the candidates are the candidates selected by the user (Yes in step S22), the controller 101 directly moves to step S24 and executes processing of displaying the extraction result of the markers.

In the processing in step S20, in a case where the candidate=0 is satisfied (Yes in step S20), the controller 101 executes processing of extracting an alternative colorimetric position (step S25), and displays the extracted alternative colorimetric position on the display 106 (user interface: UI) of the personal computer 1 to present the alternative colorimetric position to the user (step S26). That is, in a case where there are no objects serving as markers, when the object to be measured is included on straight lines each connecting two of the extracted candidates for objects serving as markers, a candidate closest to the object position specified as the colorimetric position P, in the candidates, is presented to the user as the alternative colorimetric position. Details of the alternative colorimetric position extraction processing will be described below.

Characteristic Point Extraction Processing

Next, characteristic point extraction processing that is the processing in step S18 in FIG. 6 will be described using the flowchart in FIG. 8. In this characteristic point extraction processing, processing of extracting the characteristic point having the characteristic recognizable by the user from among the peripheral objects extracted in the processing in step S16 or S17 with the guide rail 5 as the starting point is performed, as described below.

The controller 101 determines whether an object is smaller than the width W of the guide groove 5a of the guide rail 5 (step S181). In a case where the object is smaller (Yes in step S181), the controller 101 records the object as the characteristic point (step S182). In a case where the object is larger than the width W of the guide groove 5a (No in step S181), the controller 101 determines whether there is an edge portion in the letter/image object (step S183). In a case where there is the edge portion (Yes in step S183), the controller 101 proceeds to step S182 and records the object as the characteristic point.

In a case where there is no edge portion (No in step S183), the controller 101 determines whether one side of an image object, in the image objects, goes along the guide groove 5a of the guide rail 5 (step S184). In a case where there is an image object with one side going along the guide groove 5a (Yes in step S184), the controller 101 proceeds to step S182 and records the image object as the characteristic point. In a case where there is no image object with one side going along the guide groove 5a (No in step S184) or after the processing in step S182, the controller 101 determines whether there are other extracted peripheral objects (step S185).

Then, in a case where there are other extracted objects (Yes in step S185), the controller 101 returns to step S181 and repeatedly executes the series of processing for characteristic point extraction. In a case where there are no other extracted objects (No in step S185), the controller 101 terminates the series of processing and proceeds to the processing in step S19 in FIG. 6.

Marker Candidate Extraction Processing

Figure 9:
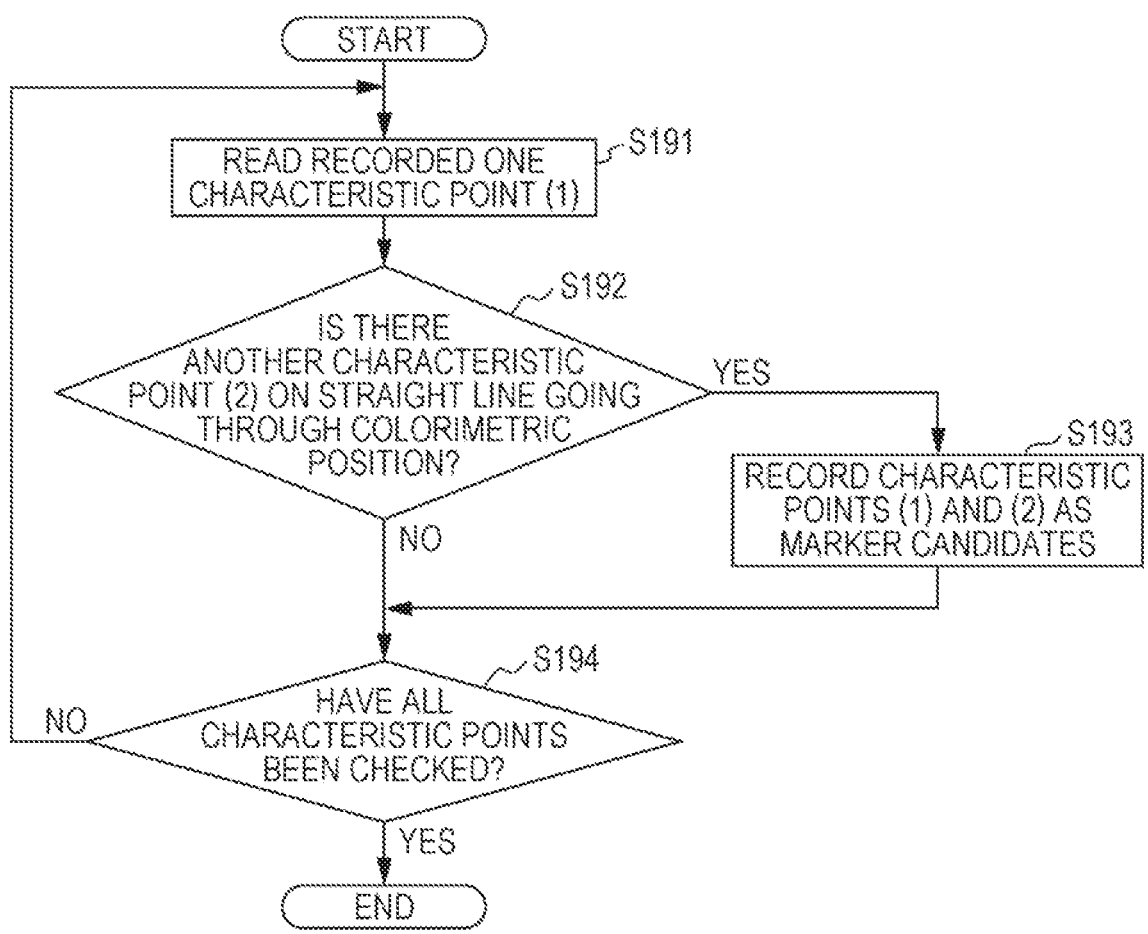
FIG. 9 is a flowchart illustrating an example of a flow of marker candidate extraction processing.

Next, marker candidate extraction processing that is the processing in step S19 in FIG. 6 will be described with reference to the flowchart in FIG. 9. In this marker candidate extraction processing, processing of extracting candidates that can include the colorimetric position P on the straight line connecting the characteristic points, as described below, from among the characteristic points extracted in the processing in step S18 in FIG. 6, is performed.

Figure 8:
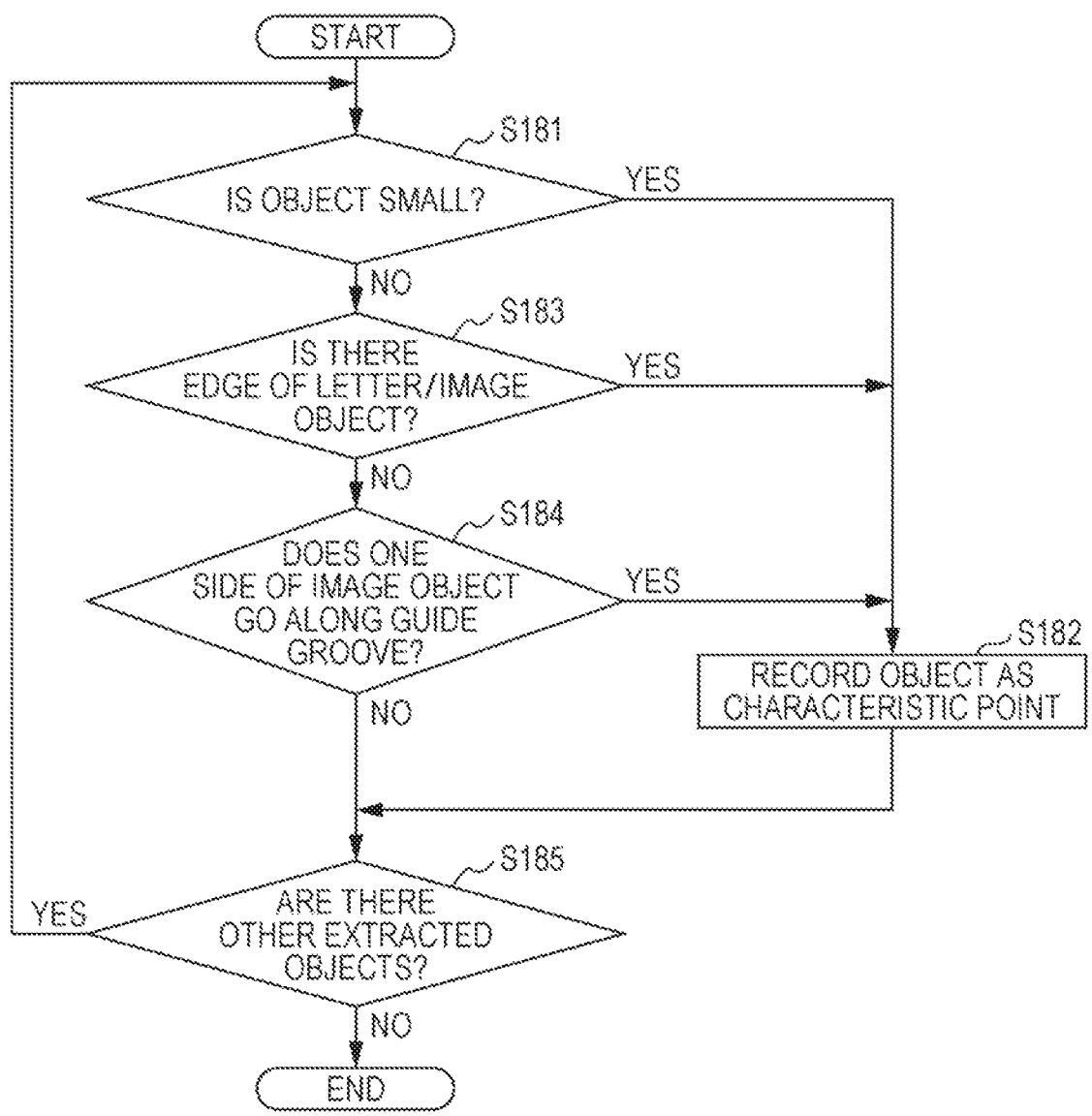
FIG. 8 is a flowchart illustrating an example of a flow of characteristic point extraction processing.

The controller 101 reads one characteristic point (1) recorded in the processing in step S182 in FIG. 8 (step S191), and then determines whether there is another characteristic point (2) on a straight line going through the colorimetric position P (step S192). Then, when there is the another characteristic point (2) (Yes in step S192), the controller 101 records the characteristic point (1) and the characteristic point (2) as the marker candidates (step S193).

In a case where there is no another characteristic point (2) (No in step S192) or after the processing in step S193, the controller 101 determines whether all the characteristic points recorded in the processing in step S182 in FIG. 8 have been checked (step S194). Then, when all the characteristic points have not been checked yet (No in step S194), the controller 101 returns to step S191 and repeatedly executes the series of processing for the marker candidate extraction. When all the characteristic points have been checked (Yes in step S194), the controller 101 terminates the series of processing and proceeds to the processing in step S20 in FIG. 6.

Figure 10:
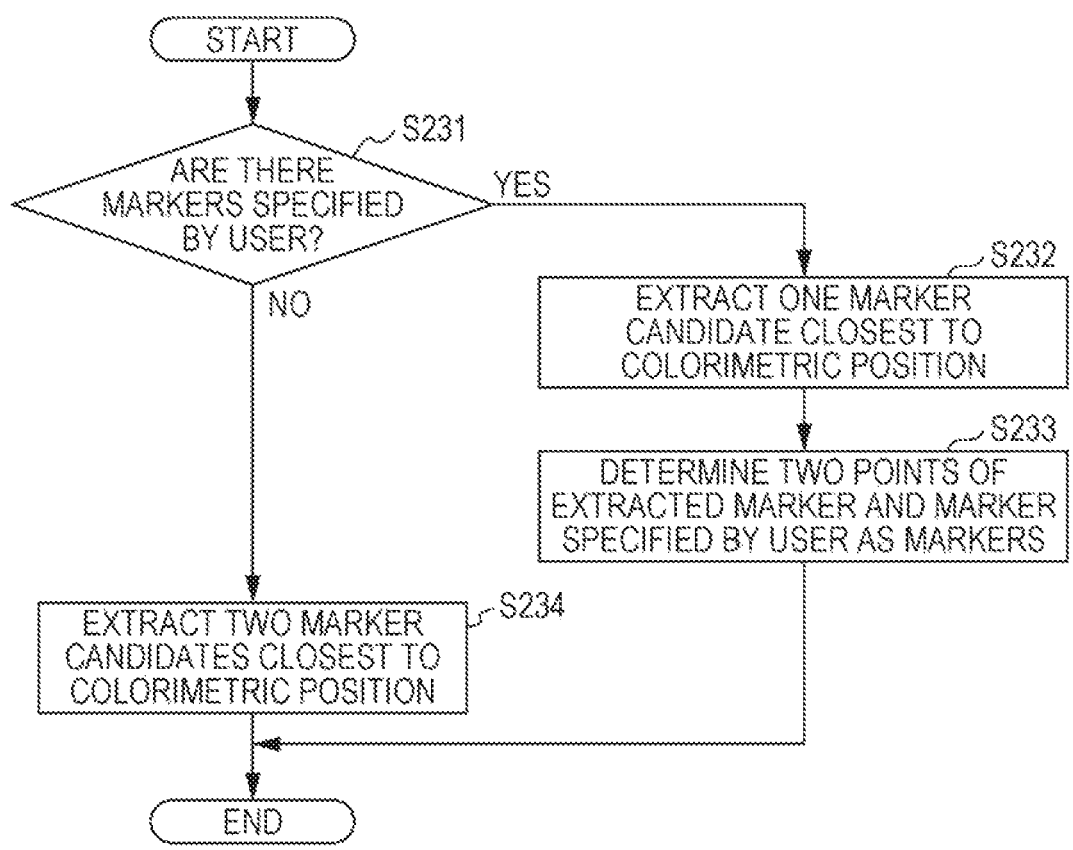
FIG. 10 is a flowchart illustrating an example of a flow of marker candidate narrowing processing.

Next, marker candidate narrowing processing that is the processing in step S23 in FIG. 6 will be described with reference to the flowchart in FIG. 10. In this marker candidate narrowing processing, processing of narrowing down the marker candidates is performed, as described below, in a case where there is a plurality of candidates extracted in the processing in step S19 in FIG. 6 or in a case where the candidates are not the candidates selected by the user.

The controller 101 determines whether there are markers specified by the user (step S231). In a case where there are the markers specified by the user (Yes in step S231), the controller 101 extracted one marker candidate closest to the colorimetric position P (step S232) and then determines the two points of the extracted marker and the marker specified by the user as the markers (step S233). In a case where there are no markers specified by the user (No in step S231), the controller 101 extracts two marker candidates closest to the colorimetric position P and determines the extracted two makers as the markers (step S234).

Alternative Colorimetric Position Extraction Processing

Figure 11:
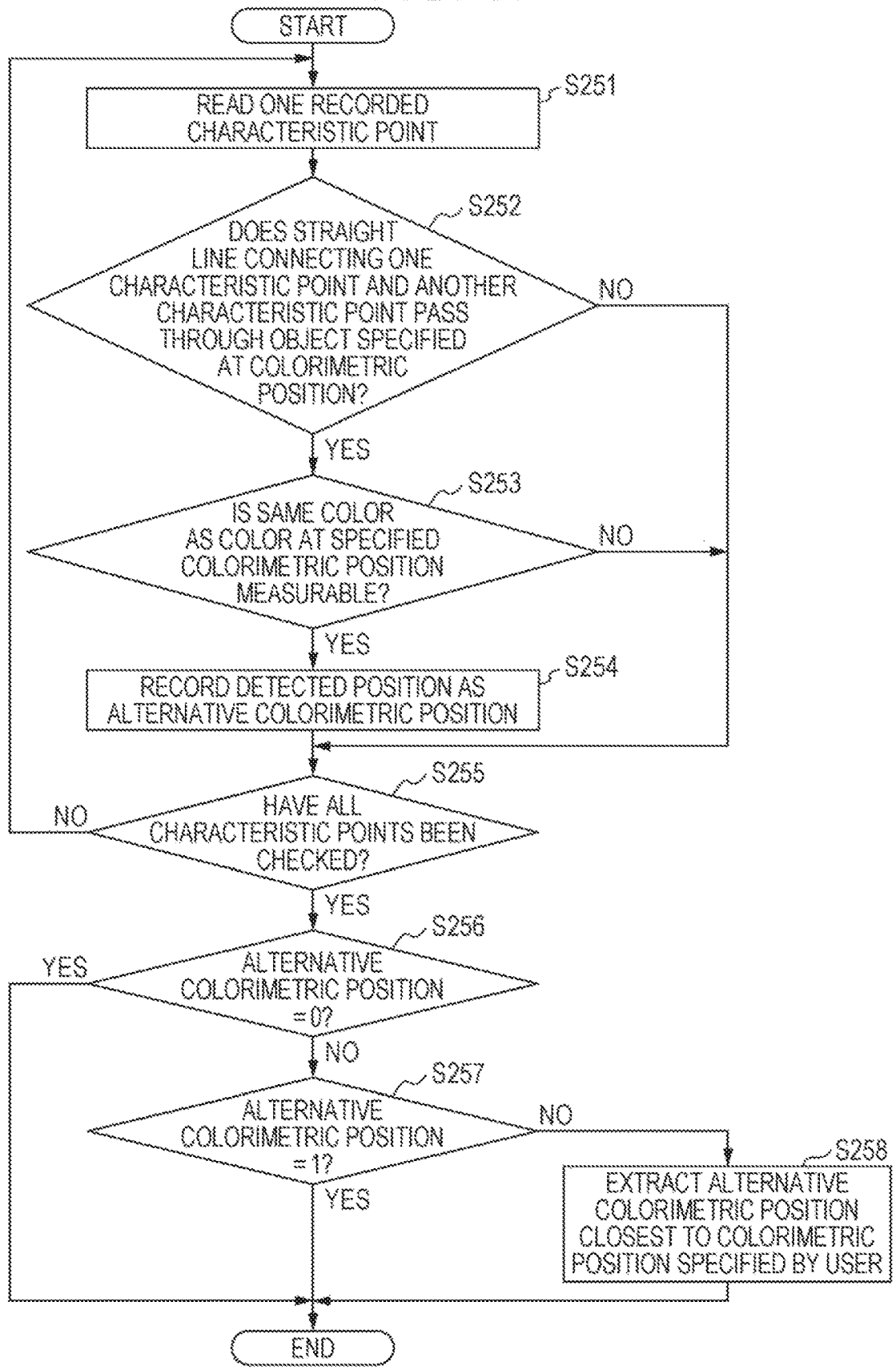
FIG. 11 is a flowchart illustrating an example of a flow of alternative colorimetric position extraction processing.

Next, alternative colorimetric position extraction processing that is the processing in step S25 in FIG. 6 will be described with reference to the flowchart in FIG. 11. In this alternative colorimetric position extraction processing, processing of extracting, as the alternative colorimetric position, a candidate closest to the object position specified as the colorimetric position P from the candidates of when the object to be measured is included on straight lines each connecting two of the extracted candidates for objects serving as markers, is performed in a case where there are no object serving as markers.

The controller 101 reads one characteristic point recorded in the processing in step S182 in FIG. 8 (step S251), and then determines whether a straight line connecting the one characteristic point and another characteristic point passes through the object specified at the colorimetric position P (step S252). Then, in a case where the controller 101 determines that the straight line connecting the one characteristic point and the another characteristic point passes through the object specified at the colorimetric position P (Yes in step S252), the controller 101 determines whether the same color as the color of the specified colorimetric position P is measurable (step S253). In a case where the same color is measurable (Yes in step S253), the controller 101 records the detected position as the alternative colorimetric position (step S254).

Next, the controller 101 determines whether all the characteristic points have been checked (step S255). When all the characteristic points have not been checked yet (No in step S255), the controller 101 repeatedly executes the processing in steps S251 to S254. Note that, in a case where the controller 101 determines that the straight line connecting the one characteristic point and the another characteristic point does not pass through the object specified at the colorimetric position P in the processing in step S252 (No in step S252) or in a case where the controller 101 determines that the same color as the color of the specified colorimetric position P is not measurable in the processing in step S253 (No in step S253), the controller 101 proceeds to step S255.

When all the characteristic points have been checked (Yes in step S255), the controller 101 determines whether the alternative colorimetric position is 0 (step S256). In a case where the alternative colorimetric position=0 is satisfied (Yes in step S256), the controller 101 terminates the series of processing for extracting the alternative colorimetric position. In a case where the alternative colorimetric position=0 is not satisfied (No in step S256), the controller 101 determines whether the alternative colorimetric position=1 is satisfied (step S257). In a case where the alternative colorimetric position=1 is not satisfied (No in step S257), the controller 101 extracts the alternative colorimetric position closest to the colorimetric position specified by the user (step S258) and terminates the series of processing for extracting the alternative colorimetric position.

When the colorimetric position P on the printed material 6 has been specified by the user by the above-described colorimetric position presentation system (method), extraction of the candidates for objects serving as markers is performed on the basis of the specified colorimetric position P, and the extracted two points are presented to the user. In response to the presentation, the user aligns the guide grooves 5a of the guide rail 5 with the two presented points (see FIG. 5) and moves the manual colorimeter 3 along the guide groove 5a, thereby to perform the scan colorimetry of the colorimetric position P on the printed material 6. That is, the scan colorimetry is performed along a straight line (hereinafter may be described as "colorimetric line") connecting the presented two points. A one-dimensional colorimetric value measured by the manual colorimeter 3, for example, color information L*a*b* of a color space (uniform color space) is accumulated in a time series manner in a storage (for example, the RAM 104 in FIG. 3).

Colorimetric Value Detection System

Next, the colorimetric value detection system that detects the colorimetric value of the colorimetric position P on the basis of the colorimetry result of the colorimetric position P by the manual colorimeter 3 will be described. The present colorimetric value detection system is configured by software in the personal computer 1, and can detect not only a colorimetry result (one dimension) of the manual colorimeter 3 but also a colorimetry result (two dimensions) of a well-known automatic colorimeter. It is possible to detect colorimetric values. The function of the present colorimetric value detection system is realized by the controller 101 (see FIG. 3) of the personal computer 1.

Figure 12:
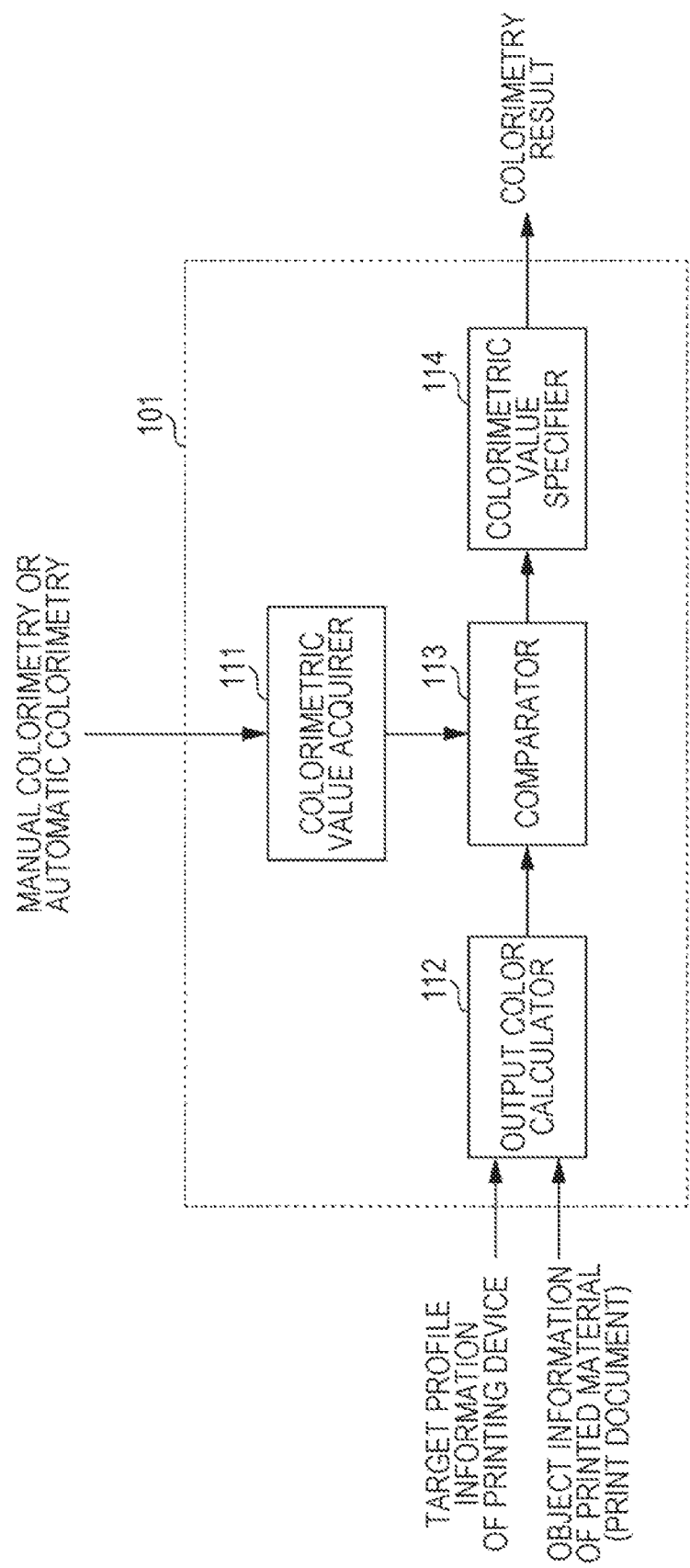
FIG. 12 is a functional block diagram of a controller for realizing functions of a colorimetric value detection system according to an embodiment of the present invention.

FIG. 12 is a functional block diagram of a controller 101 for realizing functions of a colorimetric value detection system according to an embodiment of the present invention. As illustrated in FIG. 12, the controller 101 for realizing the functions of the colorimetric value detection system includes functional parts including a colorimetric value acquirer 111, an output color calculator 112, a comparator 113, and a colorimetric value specifier 114.

The colorimetric value acquirer 111 measures the color with the manual colorimeter 3, and acquires a colorimetric value (one dimension) accumulated in a time series manner or a colorimetric value (two dimensions) measured with the automatic colorimeter as a one-dimensional colorimetric value. The output color calculator 112 calculates an output color (theoretical value) of the object at the colorimetric position from target profile information of the printing device 2 and object information at the colorimetric position on the printed material 6.

Figure 13:
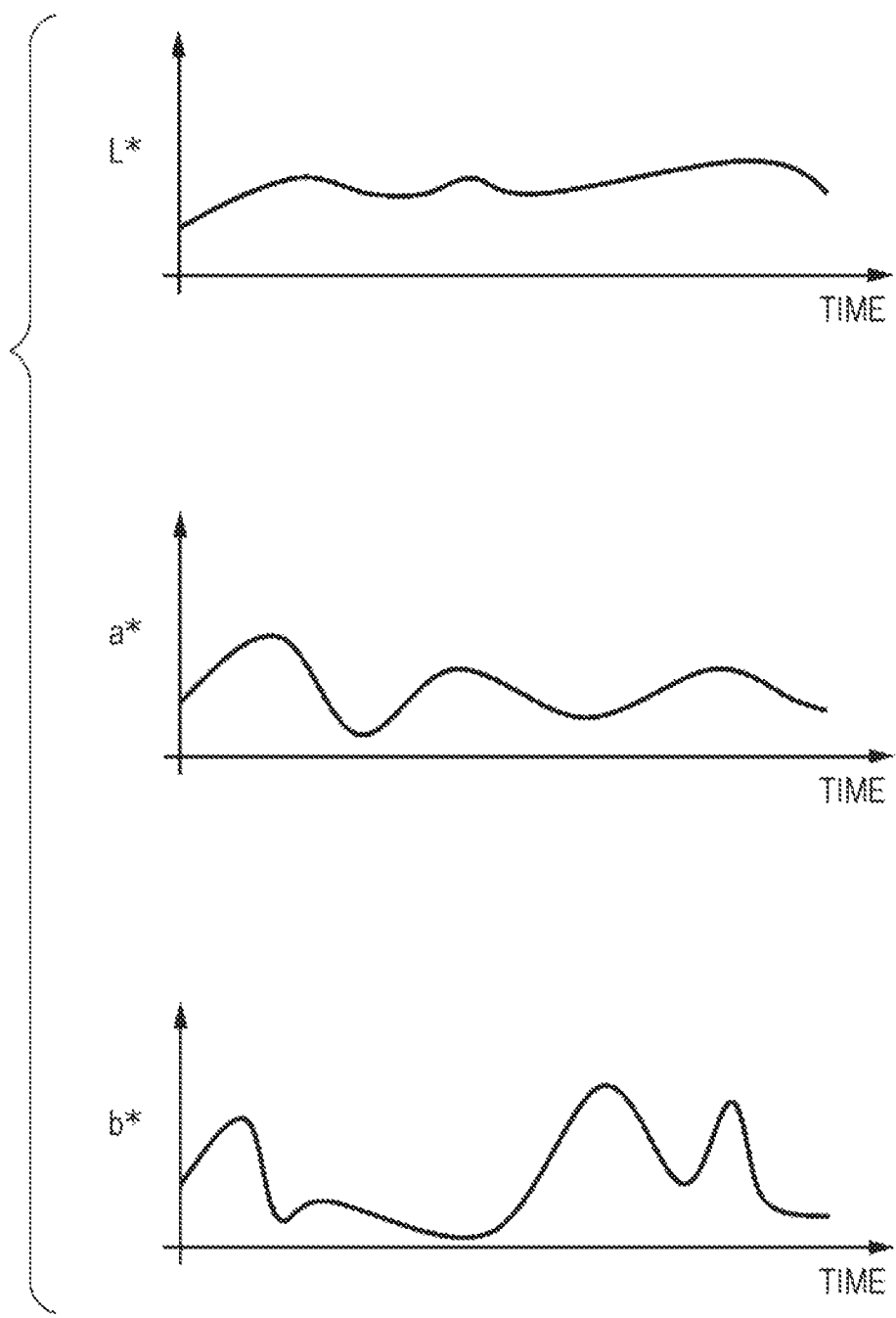
FIG. 13 is waveform diagrams illustrating an example of a phase profile.

The comparator 113 compares the one-dimensional colorimetric value acquired by the colorimetric value acquirer 111 with the output color (theoretical value) of the object calculated by the output color calculator 112. The colorimetric value specifier 114 specifies a colorimetric value of an object or at a position desired by the user from the degree of coincidence between phase profiles of the colorimetric value on the basis of a comparison result of the comparator 113. Here, the phase profile is two-axis data of the position information of the colorimetric position and the color information L*a*b* of the color space corresponding to each position information. Examples of the phase profile are illustrated in FIG. 13.

When comparing the phase profiles between the colorimetric value and the theoretical value, in a case where a color difference ΔE of each color is recorded in a colorimetric history of the printing device 2, the color difference ΔE is applicable to the comparison processing as error information between the colorimetric value and the output color (theoretical value). Specifically, whether the color is the same is determined according to whether the colorimetric value falls within the color difference +α with respect to the theoretical value. In a case where there is no colorimetric history, the determination as to whether the color is the same is made according to the color difference information ΔE specified by the user or incorporated in the system.

Further, in a case where the colorimetric value of an object or at a position desired by the user cannot be detected, comparison between the object information of the printed material 6 in the vicinity on the colorimetric line and the colorimetric value is performed and whether the colorimetric position is shifted is detected. Then, in a case where shifting of the colorimetric position is detected, which direction the colorimetric position is shifted, that is, the direction into which the colorimetric position is shifted is detected and is notified to the user.

In a case where the object at the colorimetric position is larger than the width W of the guide groove 5a of the guide rail 5, for example, in the colorimetric value specifier 114, data in the vicinity of the colorimetric position is estimated and the colorimetric value is extracted according to time-series information of the colorimetry result.

As described above, in the colorimetric value detection system according to the present embodiment, the output color calculator 112 calculates the output color (theoretical value) of the object at the colorimetric position P on the basis of the target profile information of the printing device 2 and the object information of the printed material 6. Further, the comparator 113 compares the colorimetric value (one dimension) of the colorimeter (manual colorimeter/automatic colorimeter) with the output color calculated by the output color calculator 112. Then, the colorimetric value specifier 114 specifies the colorimetric value of the object or at the position desired by the user according to the degree of coincidence of the phase profiles of the colorimetric value. By the colorimetric value specifying processing, the colorimetric color at the colorimetric position on the printed material 6 can be correctly detected.

Colorimetric Value Detection Method

Figure 14:
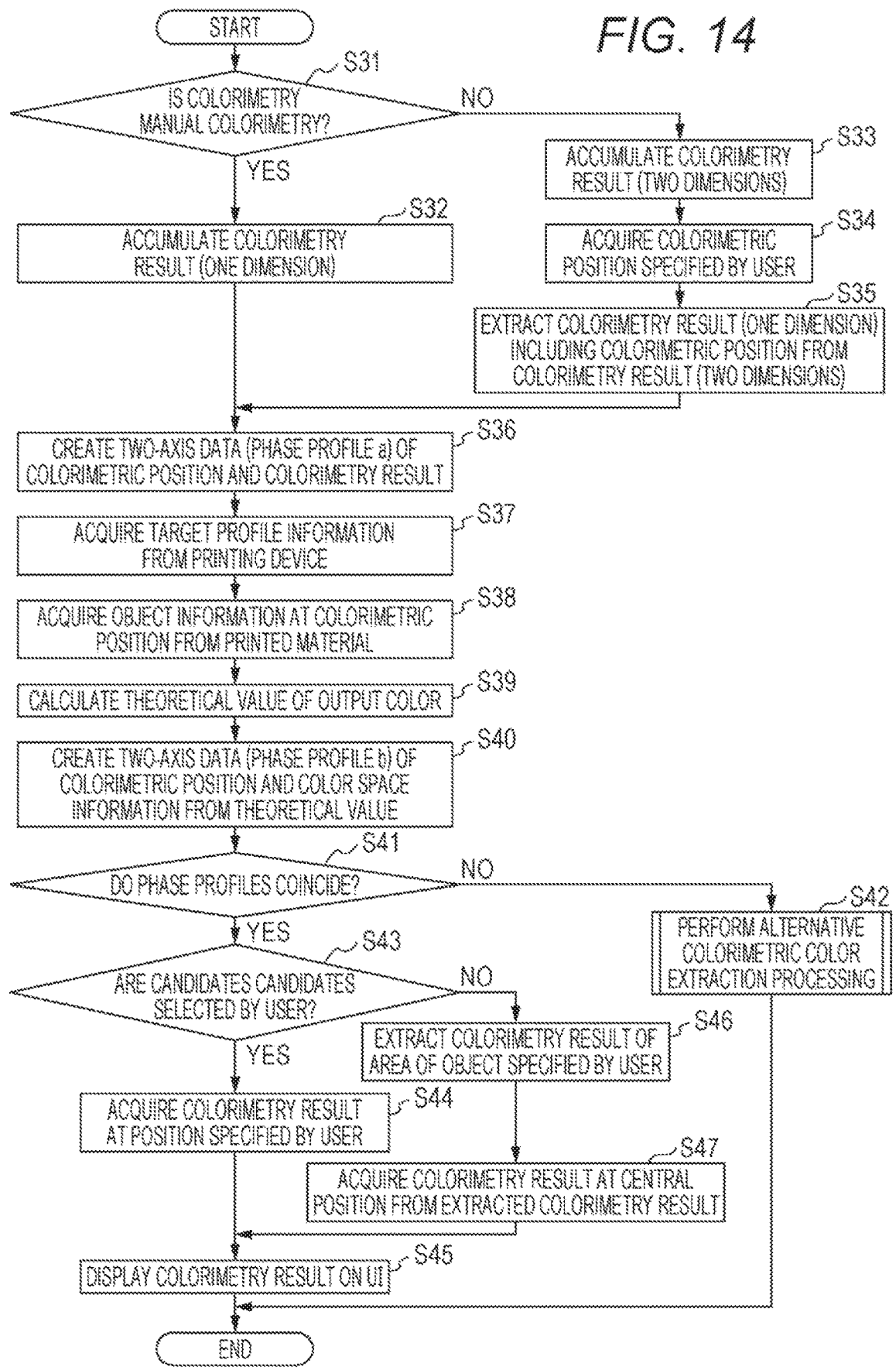
FIG. 14 is a flowchart illustrating an example of a flow of processing of a colorimetric value detection method executed in the colorimetric value detection system according to an embodiment of the present invention.

Next, processing of a colorimetric value detection method executed in the colorimetric value detection system having the above configuration will be described with reference to the flowchart in FIG. 14. A series of processing for the colorimetric value detection is executed under the control of the controller 101. This point similarly applies to the processing to be described below.

The controller 101 determines whether the colorimetry is manual colorimetry using the manual colorimeter 3 (step S31). In a case of the manual colorimetry (Yes in step S31), the controller 101 stores the colorimetry result (one dimension) with the manual colorimeter 3 in a storage (step S32). In a case where the colorimetry is not the manual colorimetry (No in step S31), the colorimetry is automatic colorimetry with the automatic colorimeter. In a case of the automatic colorimetry, the controller 101 stores the colorimetry result (two dimensions) with the automatic colorimeter in the storage (step S33), then acquires the colorimetric position P specified by the user (step S34), and then extracts the colorimetry result (one dimension) including the colorimetric position P from the colorimetry result (two dimensions) with the automatic colorimeter (step S35).

Next, the controller 101 creates two-axis data (phase profile a) of the colorimetric position P and the colorimetry result (step S36), then acquires the target profile information from the printing device 2 (step S37), and then acquires the object information at the colorimetric position P from the printed material 6 (step S38). See FIG. 13 for the examples of the phase profile that is the two-axis data of the position information of the colorimetry and the color information L*a*b* of the color space corresponding to each position information.

Next, the controller 101 calculates the output color (theoretical value) of the object at the colorimetric position P from the target profile information of the printing device 2 and the object information at the colorimetric position P (step S39), and then creates the two-axis data (phase profile b) of the colorimetric position P and the color information L*a*b* of the color space from the calculated theoretical value (step S40).

Next, the controller 101 compares the phase profile a created in step S36 with the phase profile b created in step S40, and determines whether the phase profiles coincide with each other (step S41). Then, in a case where the phase profiles do not coincide with each other (No in step S41), the controller 101 executes the alternative colorimetric position extraction processing (step S42) and terminates the series of processing for colorimetric value detection. Details of the alternative colorimetric position extraction processing will be described below.

In a case where the phase profiles coincide with each other (Yes in step S41), the controller 101 determines whether the candidates are the candidates selected by the user (step S43). In a case where the candidates are the candidates selected by the user (Yes in step S43), the controller 101 acquires the colorimetry result at the position specified by the user (step S44). Then, the controller 101 displays the acquired colorimetry result on the display 106 (UI) of the personal computer 1 (step S45).

In a case where the candidates are not the candidates selected by the user (No in step S43), the controller 101 extracts the colorimetry result of an area of the object specified by the user (step S46), then acquires the colorimetry result at a central position from the extracted colorimetry result (step S49), and thereafter proceeds to step S45 and displays the acquired colorimetry result.

Alternative Colorimetric Position Extraction Processing

Figure 15:
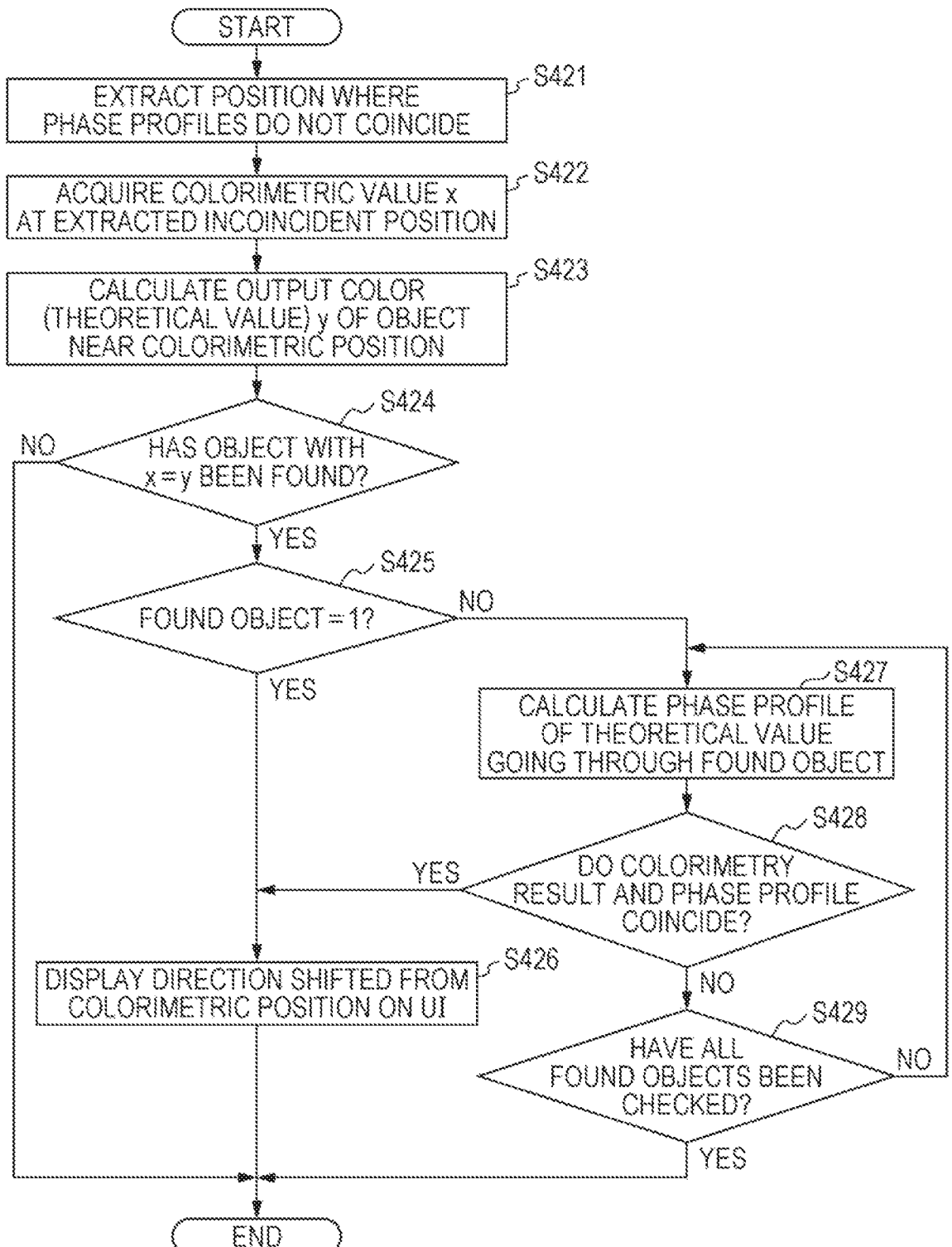
FIG. 15 is a flowchart illustrating an example of a flow of the alternative colorimetric position extraction processing.

Next, the alternative colorimetric position extraction processing that is the processing in step S42 will be described with reference to the flowchart in FIG. 15. This alternative colorimetric position extraction processing is executed in a case where the phase profile a created in step S36 and the phase profile b created in step S40 do not coincide with each other in the determination processing in step S41.

The controller 101 extracts a position at which the phase profile a and the phase profile b do not coincide in the comparison (step S421), then acquires a colorimetric value at the extracted incoincident position as a colorimetric value x (step S422), and then calculates an output color (theoretical value) y of an object in the vicinity of the colorimetric position P (step S423).

Next, the controller 101 determines whether an object where the colorimetric value x and the output color (theoretical value) y coincide with each other (x=y) has been found (step S424). In a case where the object is not found (No in step S424), the controller 101 terminates the series of processing for the alternative colorimetric position extraction.

In a case where the object with x=y has been found (Yes in step S424), the controller 101 determines whether the number of the found objects is 1 (step S425). When the found object=1 is satisfied (Yes in step S425), the controller 101 displays the direction shifted from the colorimetric position on the display 106 (UI) of the personal computer 1 (step S426).

In a case where the found object=1 is not satisfied (No in step S425), the controller 101 calculates a phase profile of a theoretical value going through the found object (step S427), and then determines whether the colorimetry result and the phase profile calculated in step S427 coincide with each other (step S428). Then, in a case where the colorimetry result and the phase profile coincide with each other (Yes in step S428), the controller 101 proceeds to step S426 and displays the direction shifted from the colorimetric position on the display 106 (UI).

In a case where the colorimetry result and the phase profile calculated in step S427 do not coincide with each other (No in step S428), the controller 101 determines whether all the found objects found in step S424 have been checked (step S429). In a case where all the found objects have been checked (Yes in step S429), the controller 101 terminates the series of processing for alternative colorimetric position extraction. When all the found objects have not been checked yet (No in step S429), the controller 101 returns to step S427 and repeatedly executes the processing in steps S427 to S429.

Modification

Although embodiments of the present invention have been described and illustrated in detail, the disclosed embodiments are made for purposes of illustration and example only and not limitation. The scope of the present invention should be interpreted by terms of the appended claims That is, various modifications or improvements can be added to the above embodiment within the scope not deviating from the gist of the present invention, and a mode to which such modification or improvement is added is also included in the technical scope of the present invention.

What is claimed is:

1. A colorimetric value detection system that detects a colorimetric value at a colorimetric position of a printed material using a colorimeter, the colorimetric value detection system comprising:
   a hardware processor that:
   calculates an output color of an object at the colorimetric position on the basis of target profile information of a printing device and object information of the printed material; and
   compares the colorimetric value of the colorimeter with the output color calculated by the hardware processor, wherein
   the colorimetric value of an object or at a position desired by a user is specified from a degree of coincidence of phase profiles of the colorimetric value.

2. The colorimetric value detection system according to claim 1, wherein
   the colorimetric value is a one-dimensional colorimetric value measured by a manual colorimeter and accumulated or a one-dimensional colorimetric value extracted from a two-dimensional colorimetric value measured by an automatic colorimeter.

3. The colorimetric value detection system according to claim 1, wherein
   the phase profile is two-axis data of positional information of the colorimetric position and color information of a color space corresponding to each positional information.

4. The colorimetric value detection system according to claim 1, wherein,
   in a case where a color difference of each color is recorded in a colorimetric history of the printing device, the hardware processor applies the color difference to comparison processing as error information between the colorimetric value and the output color when comparing the colorimetric value with the output color.

5. The colorimetric value detection system according to claim 1, wherein,
   in a case where the hardware processor has not been able to specify the colorimetric value of an object or at a position desired by a user, the hardware processor compares object information of a printed material in a vicinity on a colorimetric line measured by the colorimeter with the colorimetric value to detect whether the colorimetric position is shifted.

6. The colorimetric value detection system according to claim 5, wherein,
   in a case where the hardware processor has detected the shift of the colorimetric position, the hardware processor detects a direction into which the colorimetric position is shifted and notifies the user of the direction.

7. A colorimetric value detection method of detecting a colorimetric value at a colorimetric position of a printed material using a colorimeter, the colorimetric value detection method comprising:
   calculating an output color of an object at the colorimetric position on the basis of target profile information of a printing device and object information of the printed material; and
   comparing the colorimetric value of the colorimeter with the output color, and specifying the colorimetric value of an object or at a position desired by a user from a degree of coincidence of phase profiles of the colorimetric value.

\* \* \* \* \*